United States Patent Office 3,220,283
Patented Nov. 30, 1965

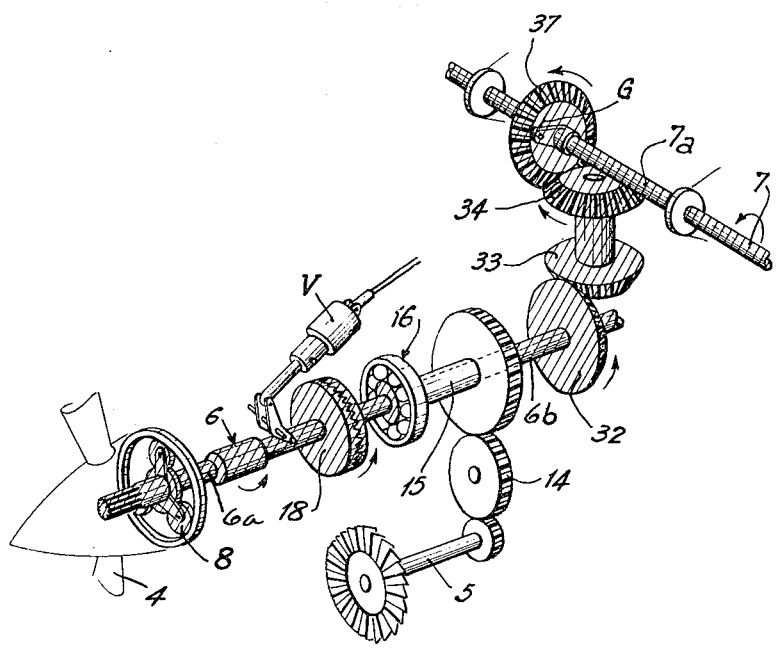

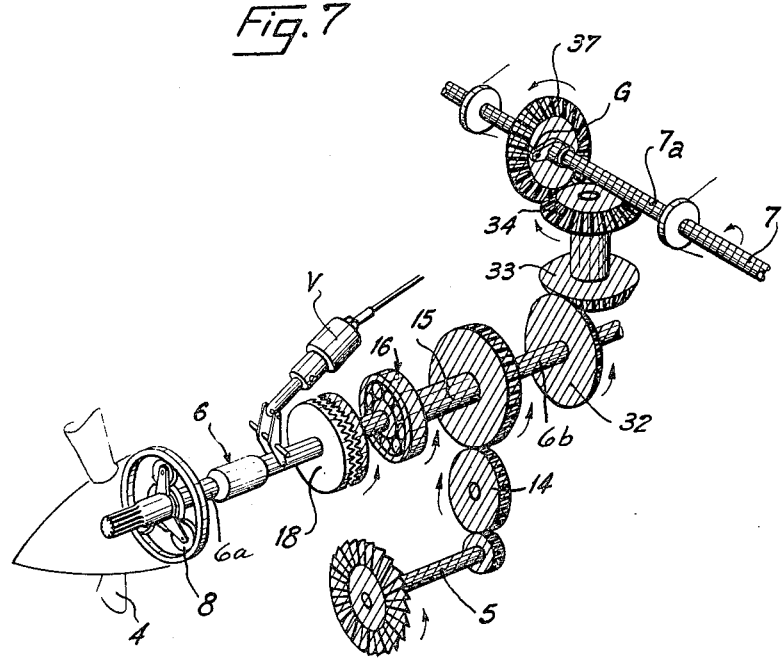

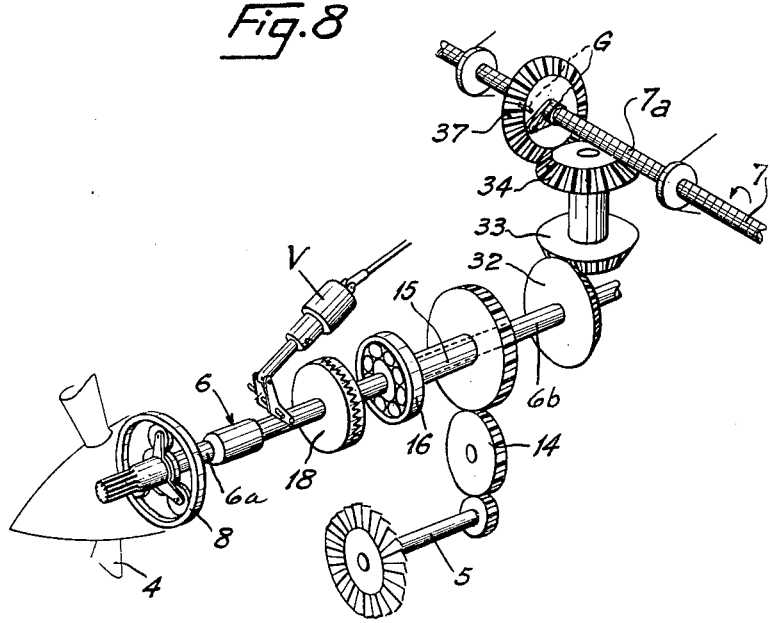

3,220,283
SAFETY DEVICE FOR AIRCRAFT WITH MECHANICALLY COUPLED PROPELLERS
Armand G. Ricard, Viroflay, France, assignor to Societe Anonyme des Ateliers d'Aviation Louis Breguet, Paris, France, a company of France
Filed May 29, 1962, Ser. No. 198,643
Claims priority, application France, June 7, 1961, 864,188
5 Claims. (Cl. 74—661)

Aircraft are known which comprise a plurality of propellers driven by one or more engines and whose shafts are mechanically coupled, by a general shaft, in such a manner that these propellers all rotate at the same speed.

The object of the present invention is to provide for such aircraft a safety apparatus so arranged that if any part of the mechanism is rendered unusable this does not result in the immediate interruption of flight, and the aircraft is allowed to return to the ground by using to the best advantage those parts of the mechanism which remain operative.

With aircraft of the kind indicated hereinbefore, three kinds of trouble may be envisaged;

It is possible for one of the engines to have a breakdown or for the reduction gear which in general is interposed between the engine and the propeller shaft or shafts which it drives, to become jammed or damaged.

A defect may also occur at the propeller or at the reduction gear which usually connects the propeller to its driving shaft.

Finally, a driving shaft, the mechanism of which connects it to the general transmission shaft, or even this general transmission shaft itself may become locked.

The invention makes it possible to provide security in all these cases.

With a view to the first case, each engine is connected to the propeller shaft or shafts which it drives by a freewheel mechanism, which is preferably arranged at the output side of the reduction gear and which makes it possible for the engine and reduction gear to be isolated if there is a breakdown in the engine or reduction gear, whilst continuing to ensure the driving of the corresponding propeller or propellers from the general transmission shaft.

In order to make the consequences of the second case less serious, each propeller driving shaft is provided with a clutch which is preferably arranged before the propeller reduction gear, the pilot thus being able to declutch one propeller which is vibrating or whose reduction gear has seized, whilst the corresponding engine can continue nevertheless to provide its driving power for the general driving arrangement.

With a view to the third kind of trouble, the general transmission shaft is connected to the various driving shafts by devices making it possible to interrupt this connection and which are advantageously so designed that this interruption takes place automatically when the torque transmitted exceeds a pre-determined value. Thus, if a driving shaft or the transmission means connecting the latter to the general shaft becomes locked, the said shaft and means are isolated whilst the other continue to be connected by the general transmission shaft; moreover, if it is the general transmission shaft whose operation is defective, all the driving shafts are uncoupled from the general shaft, in which case the propellers are driven by their respective engines.

The invention is illustrated by way of example in the accompanying drawings, in which;

FIGURES 6 to 8 are diagrammatic perspective views illustrating the operation of the safety apparatus according to the invention.

Figure 1:
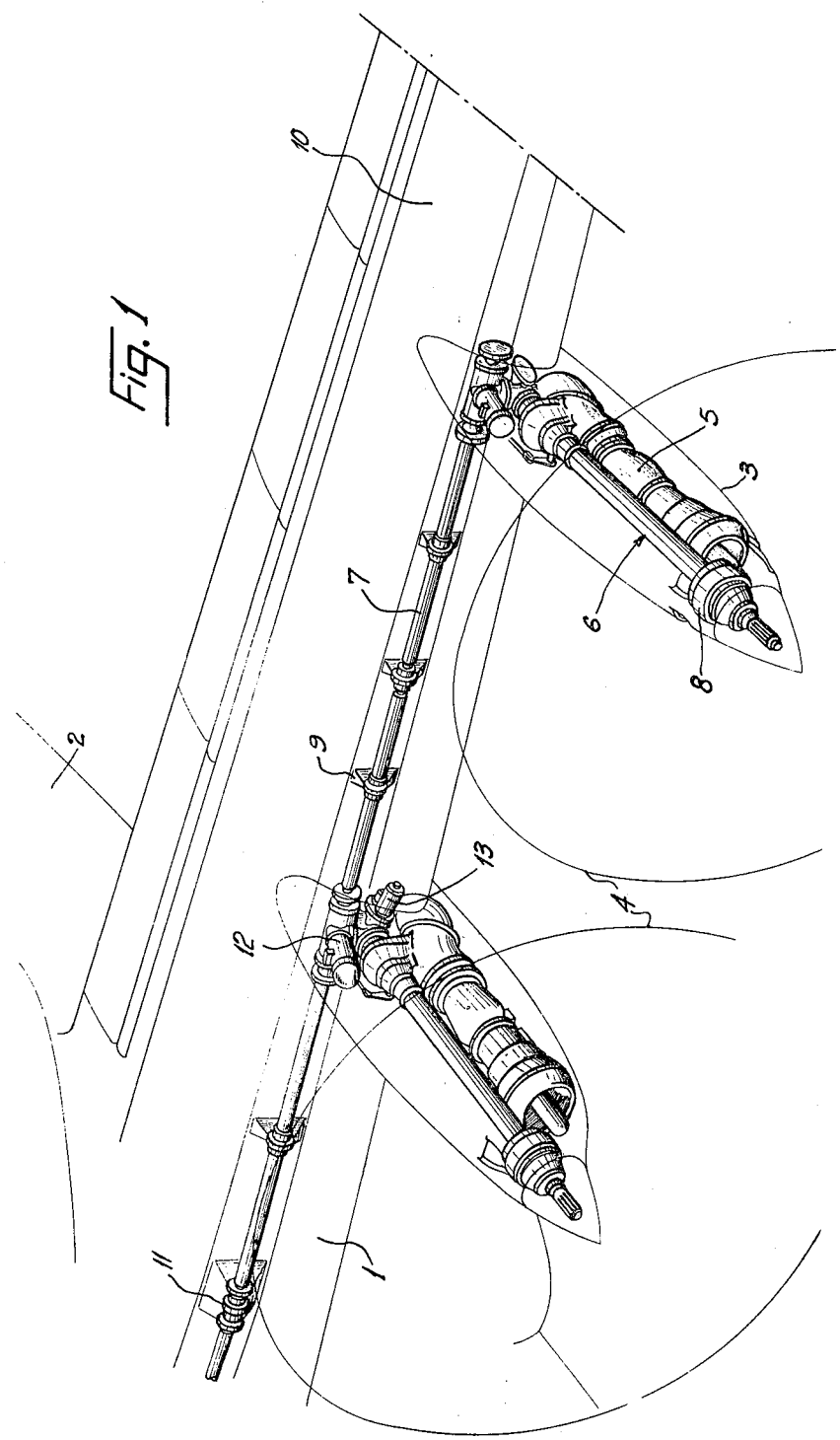
FIGURE 1 is a diagrammatic partial perspective view of an aircraft comprising the safety apparatus according to the invention.
Figure 2:
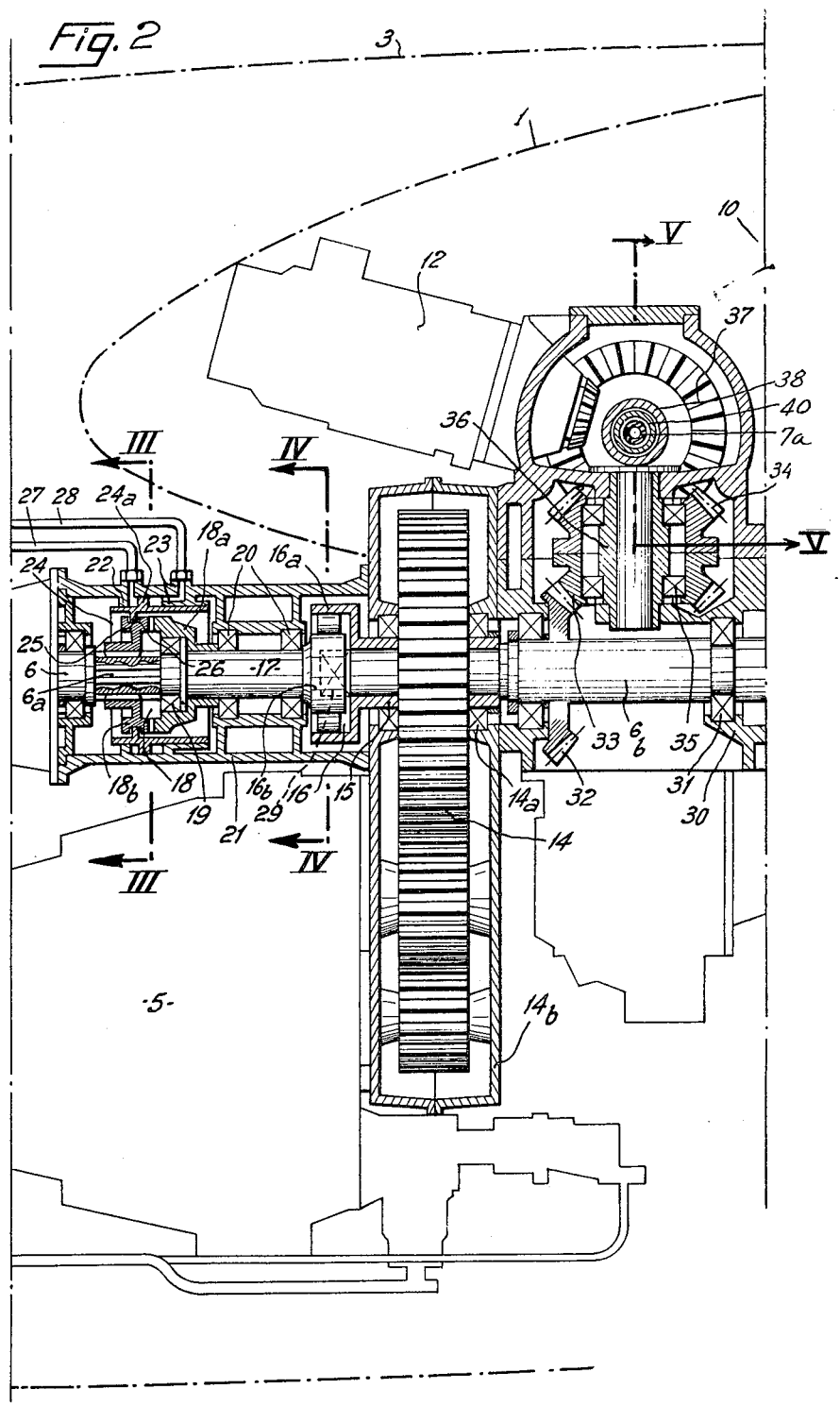
FIGURE 2 is a longitudinal sectional view of an engine unit equipped according to the invention.
Figure 3:
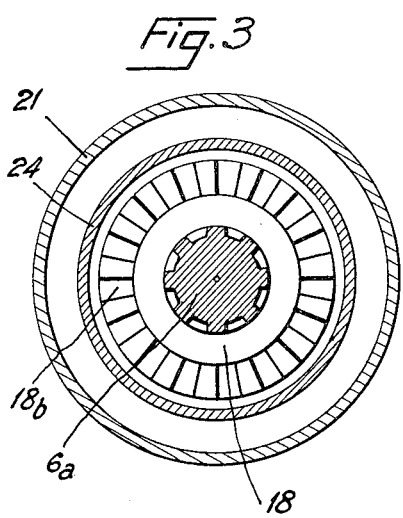
FIGURES 3 to 5 are respectively sections on III—III to V—V of FIGURE 2.
Figure 4:
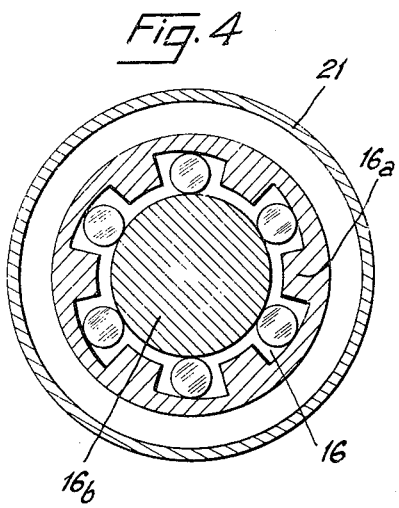

In FIGURE 1, each wing 1 of an aircraft 2 comprises, at its leading edge, arms 3 on the end of which propellers 4 are mounted. In the present example the aircraft has four propellers symmetrically arranged in twos relatively to its longitudinal median plane.

Associated with each of the propellers is an engine 5, for example a turbine-type engine, which is coupled to the driving shaft 6 of the propeller and the various driving shafts 6 are mechanically inter-connected by a general transmission shaft 7.

The engines 5 and shafts 6 are mounted in the arms 3, the shafts 6 driving the propellers by means of reduction gears 8.

The general transmission shaft 7 rotates in bearings 9 fixed to the forward longitudinal members 10 of the wings, in the median plane of the aircraft, it comprises an angular coupling 11 intended to take into account the inclination of the two halves of the shaft, which follow the leading edges of the respective wings.

Various accessories such as alternators 12 and pumps 13 are driven by the mechanism which has been described.

As is shown in more detail in FIGURES 2 to 5, each engine 5 is coupled to the corresponding shaft 6 by means of a reduction gear 14 whose tubular output shaft 15, mounted in bearings 14a of a casing 14b, is fast, at the side towards the propeller, with the casing 16a of a freewheel device 16 whose hub 16b is connected by a stub shaft 17 to one of the elements 18a of a clutch 18 preferably of the dog clutch type.

The other element 18b of the clutch 18 is mounted in such a manner as to be capable of sliding longitudinally without being able to rotate on the splined end of a first portion 6a of the driving shaft 6 leading to the propeller reduction gear 8. The said end 6a is also supported within the element 18a by a bearing 19.

The stub shaft 17 is mounted in bearings 20 of a casing 21, and within this casing, there are provided about the clutch 18 cylindrical bearing surfaces 22 and 23 within which can slide a sleeve 24 which is also cylindrical and is connected to the element 18b by dogs 25 engaged in a peripheral groove 26 of the said element. The sleeve 24 comprises an external ring 24a sliding in sealing-tight manner within the casing 21, and on either side of this ring there are provided pipes 27 and 28 conducting fluid under pressure, the assembly 21 to 28 thus forming a jack which permits the elements 18a and 18b to be clutched or declutched.

At the side opposite from the propeller 4, the output shaft 15 of the reduction gear 14 is traversed by an internal and second portion 6b of the shaft 6, fast in rotation at 29 with the hub 16b of the freewheel 16 and mounted in a casing 30 by means of bearings 31. Fixed on the portion 6b is a bevel gearwheel 32 which meshes with a bevel gearwheel 33 fast with another bevel gearwheel 34; this group of gearwheels is mounted by means of bearings 35 on an intermediate shaft 36 fixed to the casing 30.

Figure 5:
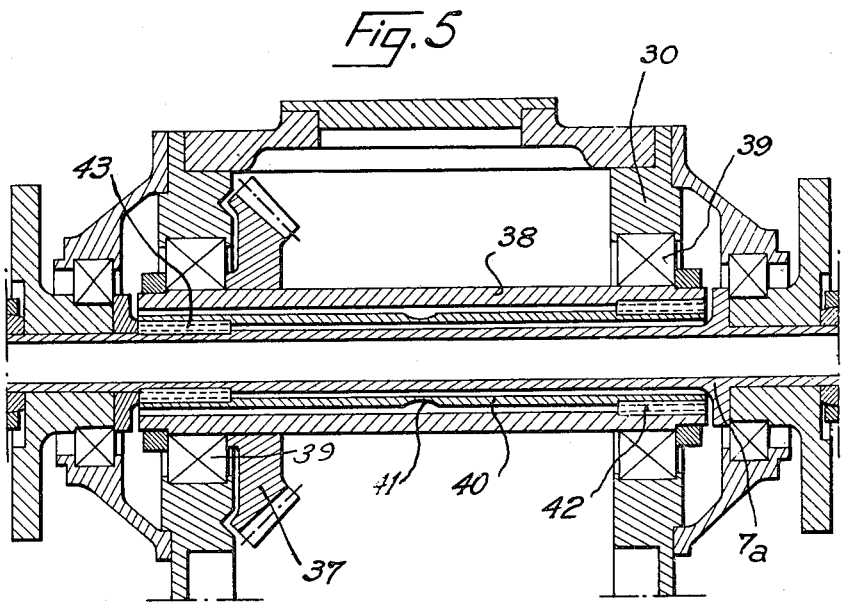

The gearwheel 34 meshes with a fourth bevel gearwheel 37 fixed on a sleeve 38 mounted in the casing 30 by means of bearing 39 (FIGURE 5).

The sleeve 38 surrounds the general transmission shaft 7, or more specifically, the portion 7a of the said shaft which extends through the casing 30, and is connected to the said portion by a sleeve 40 provided at its central portion with a weakening groove 41. This sleeve 40 is fixed at one end, at 42, to the sleeve 38 and is fixed at the other end, at 43, to the shaft portion 7a. The depth of the groove 41 is so determined that the sleeve 40 breaks when it is subjected to a torque of a certain value, thus releasing the sleeve 38 from the shaft 7.

The mechanism which has just been described operates in a manner which will be better understood with reference to FIGURES 6 to 8, in which only the essential elements have been illustrated, in a diagrammatic manner. For the sake of greater simplicity, the clutch 18 has been shown controlled by a jack V fulfilling the function of the cylinder device 21–28 and a sleeve arrangement 38–43 has been replaced by a shearing pin G connecting the gearwheel 37 to the arm of the shaft 7.

In the various figures, the portions of the mechanism which are isolated from the general transmission are not hatched.

In the case of FIGURE 6, it has been assumed that there has been a breakdown of the engine 5 or a jamming of the reduction gear 14 of this engine. Owing to the action of the freewheel device 16, the shaft 6 can continue to be driven by the shaft 7 and the three engines which are intact operate the four propellers; the engine 5 and its reduction gear 14 are isolated.

In FIGURE 7, it has been assumed that a defect has occurred at the propeller 4 or its reduction gear 8, for example, the propeller is vibrating or the reduction gear is seized. The pilot then operates the jack V in order to disengage the clutch 18, and he changes the propeller to a high pitch or feathers it. The engine 5, still connected to the general shaft 7, participates in the driving of the three remaining propellers.

As regards FIGURE 8 it has been assumed that, owing to the locking of a transmission element between the shaft 7 and propeller 4, the safety pin G has broken. All the engine unit, including the gearwheel 37, is isolated from the shaft 7. Nevertheless, the latter continues to drive the other propellers.

I claim:

1. In an aircraft having at least one engine, a plurality of shafts driven by said engine, a plurality of propellers driven by said shafts respectively and means for mechanically coupling said shafts to compel them to rotate at the same speed, a safety device comprising in combination free wheel mechanisms interposed between said engine and said shafts respectively to permit said shafts to rotate at a speed higher than that at which they are driven by said engine; a clutch interposed between each of said shafts and the corresponding propeller, means for controlling said clutch; and said means for mechanically coupling said shafts comprising for each of said shafts a member adapted to break when the torque transmitted exceeds a predetermined value.

2. The combination of claim 1 wherein said engine drives said shafts by means of reducing gears and said free-wheel mechanisms are interposed between said reducing gears and said shafts.

3. The combination of claim 1, wherein said shafts each comprises a first shaft portion and a second shaft portion in coaxial alinement and the first shaft portions drive said propellers by means of a reducing gear, and said clutches are interposed between said shaft portions.

4. An aircraft comprising in combination a plurality of engines, a plurality of driving shafts adapted to be respectively driven by said engines, each of said driving shafts comprising a first shaft portion and a second shaft portion in coaxial alinement, a reduction gear interposed between each of said engines and the corresponding driving shaft, said gear having a tubular output shaft surrounding said second portion of said driving shaft; a free wheel device having one element rotating with said tubular output shaft and a second element rotating with said second shaft portion; a first clutch element secured to said second shaft portion, a second clutch element slidably mounted on and rotating with said first shaft portion, means for controlling said second clutch element; a propeller reduction gear having an input shaft connected to said first shaft portion and an output shaft driving a propeller; a general transmission shaft adapted to be driven by the driving shafts and means for connecting said general transmission shaft to each of said driving shafts, the said means comprising a member adapted to break the connection when the torque transmitted between said shafts exceeds a predetermined value.

5. The combination of claim 4 wherein said means for connecting the general transmission shaft to said driving shafts comprise a sleeve provided with a weakening groove, said sleeve being connected at one end to said general transmission shaft and at the other end to a pinion connected to the corresponding driving shaft driven by one of said engines.

References Cited by the Examiner
UNITED STATES PATENTS

| | | | |
|---|---|---|---|
| 1,019,283 | 3/1912 | Surcouf | 74—661 |
| 1,323,321 | 12/1919 | Simpson | 74—661 X |
| 1,417,884 | 5/1922 | Bernier | 74—661 X |

DON A. WAITE, *Primary Examiner.*

BROUGHTON G. DURHAM, *Examiner.*